United States Patent
Wright et al.

(10) Patent No.: US 9,945,278 B2
(45) Date of Patent: Apr. 17, 2018

(54) EXHAUST GAS MIXER

(71) Applicant: DEERE & COMPANY, Moline, IL (US)

(72) Inventors: Cary L Wright, Cedar Falls, IA (US); Nathan A Bovee, Cedar Falls, IA (US); William F Gavin, III, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 484 days.

(21) Appl. No.: 14/533,220

(22) Filed: Nov. 5, 2014

(65) Prior Publication Data

US 2016/0123209 A1 May 5, 2016

(51) Int. Cl.
| | |
|---|---|
| *F01N 3/10* | (2006.01) |
| *F01N 3/20* | (2006.01) |
| *F01N 3/28* | (2006.01) |
| *B01F 5/00* | (2006.01) |
| *B01F 5/06* | (2006.01) |

(52) U.S. Cl.
CPC .......... *F01N 3/2066* (2013.01); *B01F 5/0057* (2013.01); *B01F 5/064* (2013.01); *F01N 3/2892* (2013.01); *F01N 2240/20* (2013.01); *Y02T 10/24* (2013.01)

(58) Field of Classification Search
CPC .... F01N 1/087; F01N 3/2892; F01N 2240/20; B01F 5/064
See application file for complete search history.

(56) References Cited

U.S. PATENT DOCUMENTS

| | | | |
|---|---|---|---|
| 8,291,696 B2 | 10/2012 | Makartchouk | |
| 8,745,978 B2 * | 6/2014 | Vanvolsem | B01D 53/90 366/336 |
| 8,966,965 B2 * | 3/2015 | Driscoll | F01N 3/208 73/114.71 |
| 8,999,276 B1 * | 4/2015 | Bui | F01N 3/2066 423/212 |
| 2002/0073697 A1 * | 6/2002 | Jankowski | F01N 3/2006 60/324 |
| 2010/0236224 A1 * | 9/2010 | Kumar | B01D 53/9477 60/297 |
| 2011/0308234 A1 * | 12/2011 | De Rudder | B01F 3/04049 60/295 |
| 2012/0124968 A1 | 5/2012 | Tamamidis et al. | |
| 2013/0104531 A1 | 5/2013 | Cho et al. | |

FOREIGN PATENT DOCUMENTS

WO 20140051605 A1 4/2014

* cited by examiner

*Primary Examiner* — Patrick Maines
*Assistant Examiner* — Jason Sheppard

(57) ABSTRACT

A power system including a selective reduction catalyst and an exhaust gas mixer positioned downstream thereof. The exhaust gas mixer includes an inlet opening a plurality of peripheral inlet openings and a plurality of swirler guides. The inlet opening is positioned to receive a first portion of exhaust gas exiting the SCR catalyst, while the plurality of peripheral inlet openings are positioned to receive a second portion of exhaust gas exiting the SCR catalyst. The swirler guides extend radially inwards from a respective peripheral inlet opening, so as to swirl the second portion of exhaust gas about and into the first portion of exhaust gas.

15 Claims, 5 Drawing Sheets

EXHAUST GAS MIXER

FIELD OF THE DISCLOSURE

The present disclosure relates to an exhaust gas mixer.

BACKGROUND OF THE DISCLOSURE

Manufacturers of nonroad diesel engines are expected to meet set emissions regulations. For example, Tier 3 emissions regulations required an approximate 65 percent reduction in particulate matter ("PM") and a 60 percent reduction in nitrogen oxides ("$NO_x$") from 1996 levels. As a further example, Interim Tier 4 regulations required a 90 percent reduction in PM along with a 50 percent drop in $NO_x$. Still further, Final Tier 4 regulations, which will be fully implemented by 2015, will take PM and $NO_x$ emissions to near-zero levels. Manufacturers of maritime engines are also expected to meet emissions regulations though they vary from the nonroad emissions regulations (e.g., International Maritime Organization regulations).

One technique for reducing $NO_x$ involves introducing chemically inert gas into the fresh intake gas for subsequent combustion. By reducing the oxygen concentration of the resulting charge to be combusted, the fuel burns slower and peak combustion temperatures are reduced, thereby lowering the production of $NO_x$. In an internal combustion engine environment, such chemically inert gases are readily abundant in the form of exhaust gas, and one known method for achieving the foregoing result is through the use of an EGR system operable to controllably introduce a recirculated portion of the exhaust gas, from the exhaust manifold, into an intake manifold.

To reduce the NOx levels further, a reductant—such as diesel exhaust fluid (DEF)—is injected into the exhaust stream, where it decomposes into ammonia (NH3). Nitrogen oxides react with the ammonia in a selective catalytic reduction (SCR) canister, which includes an SCR catalyst and ammonia oxidation catalyst (AOC). This reaction forms harmless nitrogen gas and water vapor. From the dual catalyst SCR canister, the exhaust gas flow by a NOx sensor, and out the exhaust outlet to the atmosphere.

SUMMARY OF THE DISCLOSURE

Disclosed is a power system including a selective reduction catalyst and an exhaust gas mixer positioned downstream thereof. The exhaust gas mixer includes an inlet opening a plurality of peripheral inlet openings and a plurality of swirler guides. The inlet opening is positioned to receive a first portion of exhaust gas exiting the SCR catalyst, while the plurality of peripheral inlet openings are positioned to receive a second portion of exhaust gas exiting the SCR catalyst. The swirler guides extend radially inwards from a respective peripheral inlet opening, so as to swirl the second portion of exhaust gas about and into the first portion of exhaust gas.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
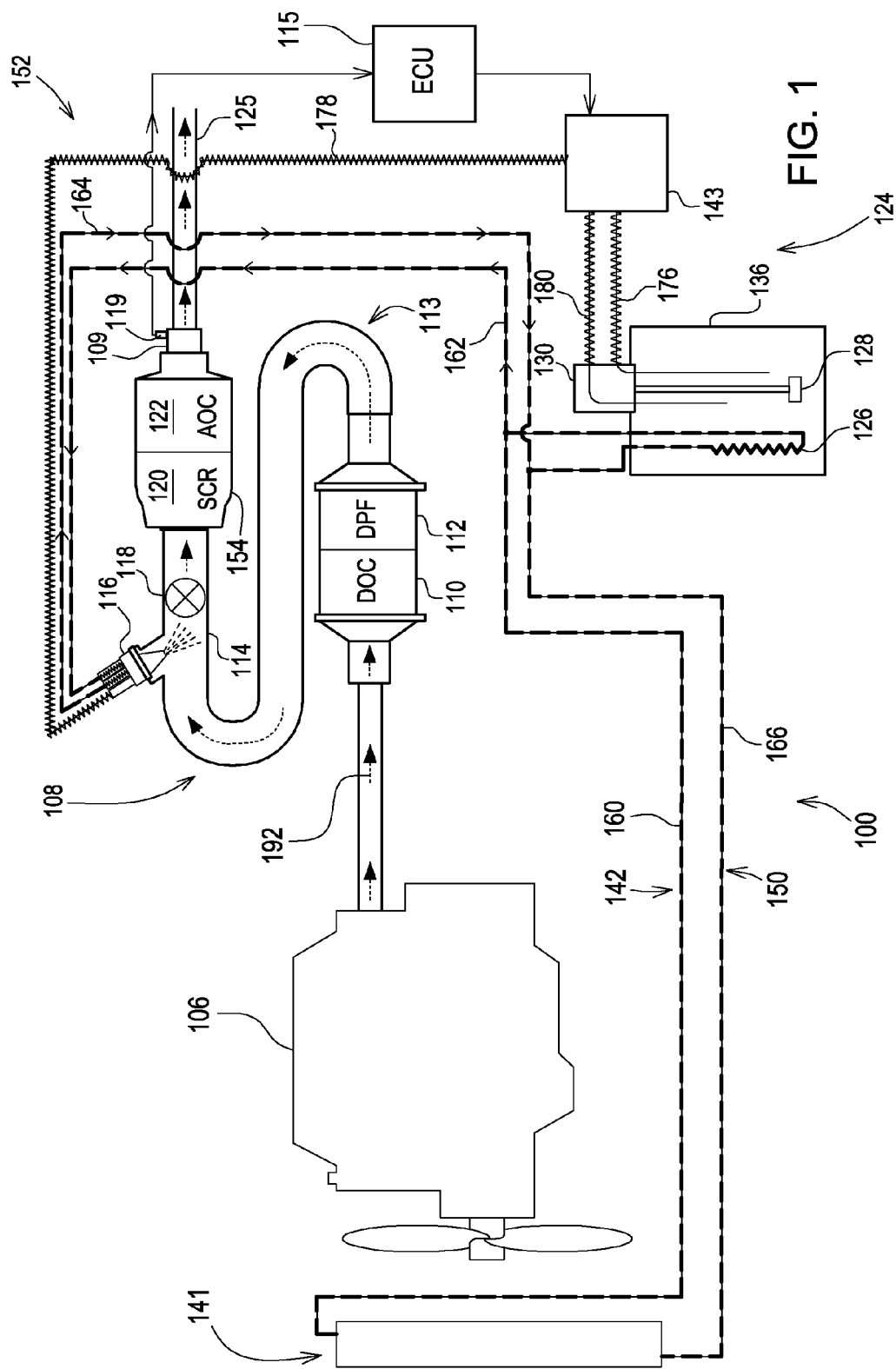
FIG. 1. is a schematic illustration of an embodiment of a power system having an SCR catalyst, an AOC downstream of the SCR catalyst, and an exhaust gas mixer downstream of the AOC.

Referring to FIG. 1, there is shown a schematic illustration of a power system 100 for providing power to a variety of machines, including on-highway trucks, construction vehicles, marine vessels, stationary generators, automobiles, agricultural vehicles, and recreation vehicles. An engine 106 of the power system 100 may be any kind that produces an exhaust gas, as indicated by directional arrow 192. For example, the engine 106 may be an internal combustion engine, such as a gasoline engine, a diesel engine, a gaseous fuel burning engine (e.g., natural gas), or any other exhaust gas producing engine. The engine 106 may be of any size, with any number cylinders, and in any configuration (e.g., "V," inline, and radial).

Further, the power system 100 includes an exhaust system 108, which has components for directing exhaust gas from the engine 106 to the atmosphere. The exhaust system 108 may include an exhaust manifold in fluid communication with the cylinders. During an exhaust stroke, at least one exhaust valve opens, allowing the exhaust gas to flow through the exhaust manifold and a turbine. The pressure and volume of the exhaust gas drives the turbine, allowing it to drive the compressor via a shaft. The combination of the compressor, the shaft, and the turbine is known as a turbocharger.

As further shown, the exhaust system 108 includes an aftertreatment system 113, and at least some of the exhaust gas passes therethrough. The aftertreatment system 113 removes various chemical compounds and particulate emissions present in the exhaust gas received from the engine 106.

The aftertreatment system 113 is shown having a diesel oxidation catalyst (DOC) 110, a diesel particulate filter (DPF) 112, and an SCR system 152, though the need for such components depends on the particular size and application of the power system 100. The SCR system 152 has a reductant delivery system 124, an SCR catalyst 120, and an ammonia oxidation catalyst AOC 122. The exhaust gas may flow through the DOC 110, the DPF 112, the SCR catalyst 120, and the AOC 122. After being treated by the aftertreatment system 113, the exhaust gas is expelled into the atmosphere via a tailpipe 125. Exhaust gas that is treated therein contains significantly fewer pollutants, such PM, $NO_x$, and hydrocarbons) than an untreated exhaust gas.

The DOC 110 may be configured in a variety of ways and contain catalyst materials useful in collecting, absorbing, adsorbing, and/or converting hydrocarbons, carbon monoxide, and/or oxides of nitrogen contained in the exhaust gas. Such catalyst materials may include, for example, aluminum, platinum, palladium, rhodium, barium, cerium, and/or alkali metals, alkaline-earth metals, rare-earth metals, or combinations thereof. The DOC 110 may include, for example, a ceramic substrate, a metallic mesh, foam, or any other porous material known in the art, and the catalyst materials may be located on, for example, a substrate of the DOC 110. The DOC 110 may also oxidize NO contained in the exhaust gas, thereby converting it to $NO_2$ upstream of the SCR catalyst 120.

The DPF 112 may be any of various particulate filters known in the art that are capable of reducing PM concentrations (e.g., soot and ash) in the exhaust gas, so as to meet requisite emission standards. Any structure capable of removing PM from the exhaust gas of the engine 106 may be used. For example, the DPF 112 may include a wall-flow ceramic substrate having a honeycomb cross-section constructed of cordierite, silicon carbide, or other suitable material to remove the PM. The DPF 112 may be electrically coupled to a controller, such as the ECU 115, that controls various characteristics of the DPF 112.

If the DPF 112 were used alone, it would initially help in meeting the emission requirements, but would quickly fill up with soot and need to be replaced. Therefore, the DPF 112 is combined with the DOC 110, which helps extend the life of the DPF 112 through the process of regeneration. The ECU 115 may measure the PM build up, also known as filter loading, in the DPF 112, using a combination of algorithms and sensors. When filter loading occurs, the ECU 115 manages the initiation and duration of the regeneration process.

Moreover, the reductant delivery system 124 may include a reductant tank 136 for storing the reductant. One example of a reductant is a solution having 32.5% high purity urea and 67.5% deionized water (e.g., DEF), which decomposes as it travels through a decomposition tube 114 to produce ammonia. Such a reductant may begin to freeze at approximately 12 deg F. (−11 deg C.). If the reductant freezes when a machine is shut down, then the reductant may need to be thawed before the SCR system 152 can function.

The reductant delivery system 124 may include a reductant header 130 mounted to the reductant tank 136, the reductant header 130 further including, in some embodiments, a level sensor 128 for measuring a quantity of the reductant in the reductant tank 136. The level sensor 128 may include a float configured to float at a liquid/air surface interface of reductant included within the reductant tank 136.

In the illustrated embodiment, the reductant header 130 includes a tank heating element 126 that receives coolant from the engine 106. The power system 100 includes a cooling system 141 having a coolant supply passage 142 and a coolant return passage 150. The cooling system 141 may be an open or closed system, depending on the specific application, while the coolant may be any form of engine coolant, including fresh water, sea water, an antifreeze mixture, and the like.

A first supply segment 160 of the coolant supply passage 142 is positioned fluidly, between the engine 106 and the tank heating element 126, for supplying coolant to the tank heating element 126. The coolant circulates, through the tank heating element 126, so as to warm the reductant in the reductant tank 136, therefore reducing the risk that the reductant freezes therein and/or thawing the reductant upon startup. In an alternative embodiment, the tank heating element 126 may, instead, be an electrically resistive heating element. A second supply segment 162 of the coolant supply passage 142 is positioned fluidly between the tank heating element 126 and a reductant injector 116 for supplying coolant thereto. The coolant heats the reductant injector 116, thereby reducing the risk that reductant freezes therein.

A first return segment 164 of the coolant return passage 150 is positioned between the reductant injector 116 and the tank heating element 126, and a second return segment 166 of the coolant return passage 150 is positioned between the engine 106 and the tank heating element 126. The first return segment 164 and the second return segment 166 return the coolant to the engine 106.

The decomposition tube 114 may be positioned downstream of the reductant injector 116 but upstream of the SCR catalyst 120. The reductant injector 116 may be, for example, an injector that is selectively controllable to inject reductant directly into the exhaust gas. As shown, the SCR system 152 may include a reductant mixer 118 that is positioned upstream of the SCR catalyst 120 and downstream of the reductant injector 116.

The reductant delivery system 124 may additionally include a reductant pressure source and a reductant extraction passage 176. The extraction passage 176 may be coupled fluidly to the reductant tank 136 and the reductant pressure source therebetween. The reductant delivery system 124 may further include a reductant supply module 143.

The reductant delivery system 124 may also include a reductant dosing passage 178 and a reductant return passage 180. The return passage 180 is shown extending into the reductant tank 136, though in some embodiments of the power system 100, the return passage 180 may be coupled to a return tube via the reductant header 130. And the reductant delivery system 124 may have—among other things—valves, orifices, sensors, and pumps positioned in the extraction passage 176, reductant dosing passage 178, and return passage 180.

As discussed above, the reductant decomposes as it travels through the decomposition tube 114 and produces ammonia. The ammonia reacts with $NO_x$ in the presence of the SCR catalyst 120, and it reduces the $NO_x$ to less harmful emissions, such as $N_2$ and $H_2O$. The SCR catalyst 120 may be any of various catalysts known in the art. For example, in some embodiments, the SCR catalyst 120 may be a vanadium-based catalyst. But in other embodiments, the SCR catalyst 120 may be a zeolite-based catalyst, such as a Cu-zeolite or a Fe-zeolite. The AOC 122 may be any of various flowthrough catalysts for reacting with ammonia and thereby produce nitrogen. Generally, the AOC 122 is utilized to remove ammonia that has slipped through or exited the SCR catalyst 120.

Figure 2:
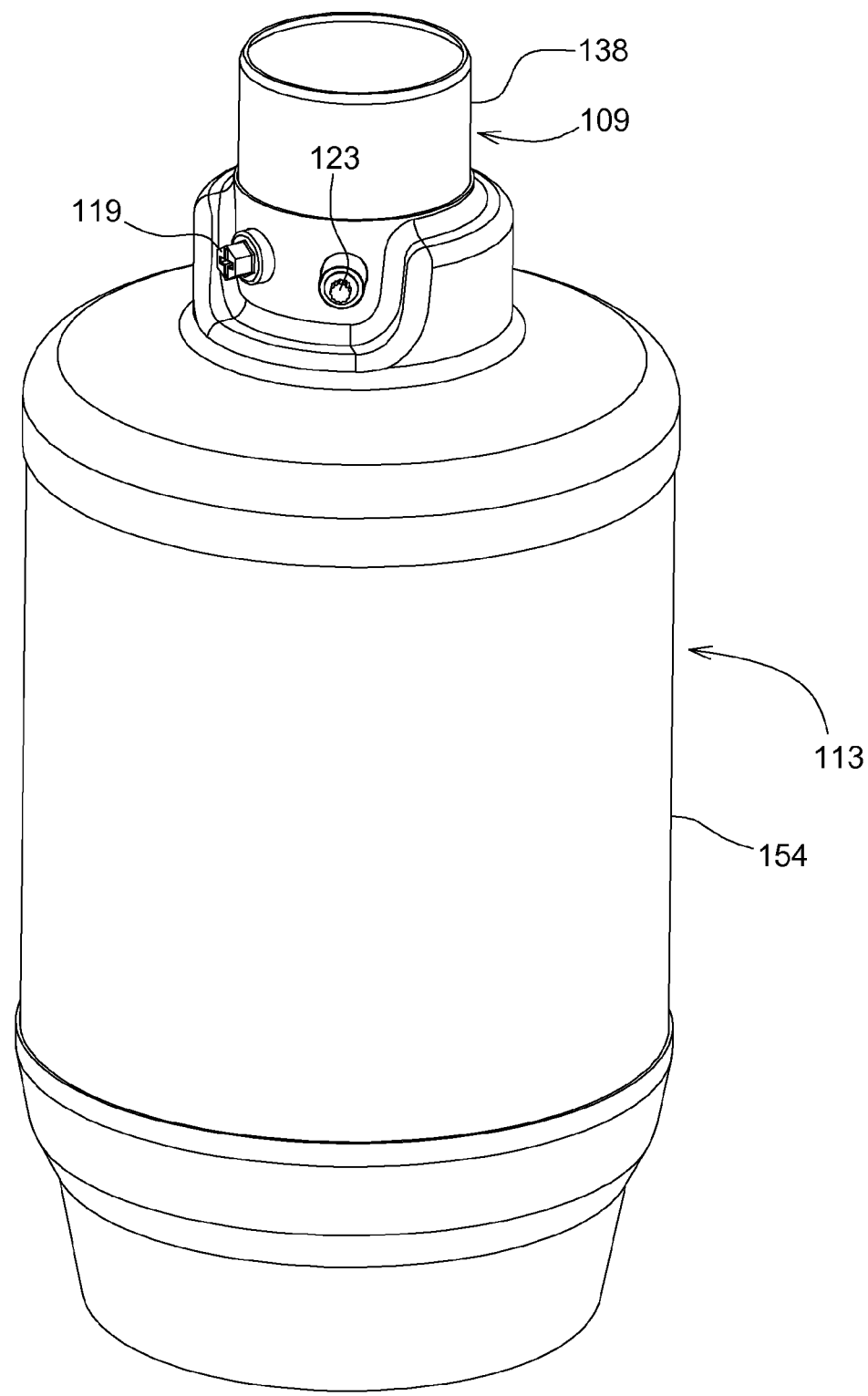
FIG. 2 is a perspective view of an SCR canister and the exhaust gas mixer positioned therein.

As shown in FIG. 2, the AOC 122 and the SCR catalyst 120 may be positioned within the same SCR canister 154, but in other embodiments, they may be separate from one another. The power system 100 includes an exhaust gas mixer 109 positioned downstream of the SCR catalyst 120 and downstream of the AOC 122. The exhaust gas mixer 109 mixes the exhaust gas the flows out of the SCR catalyst 120 and out of the AOC 122. The tailpipe 125 may be positioned downstream and around the exhaust gas mixer 109.

Figure 3:
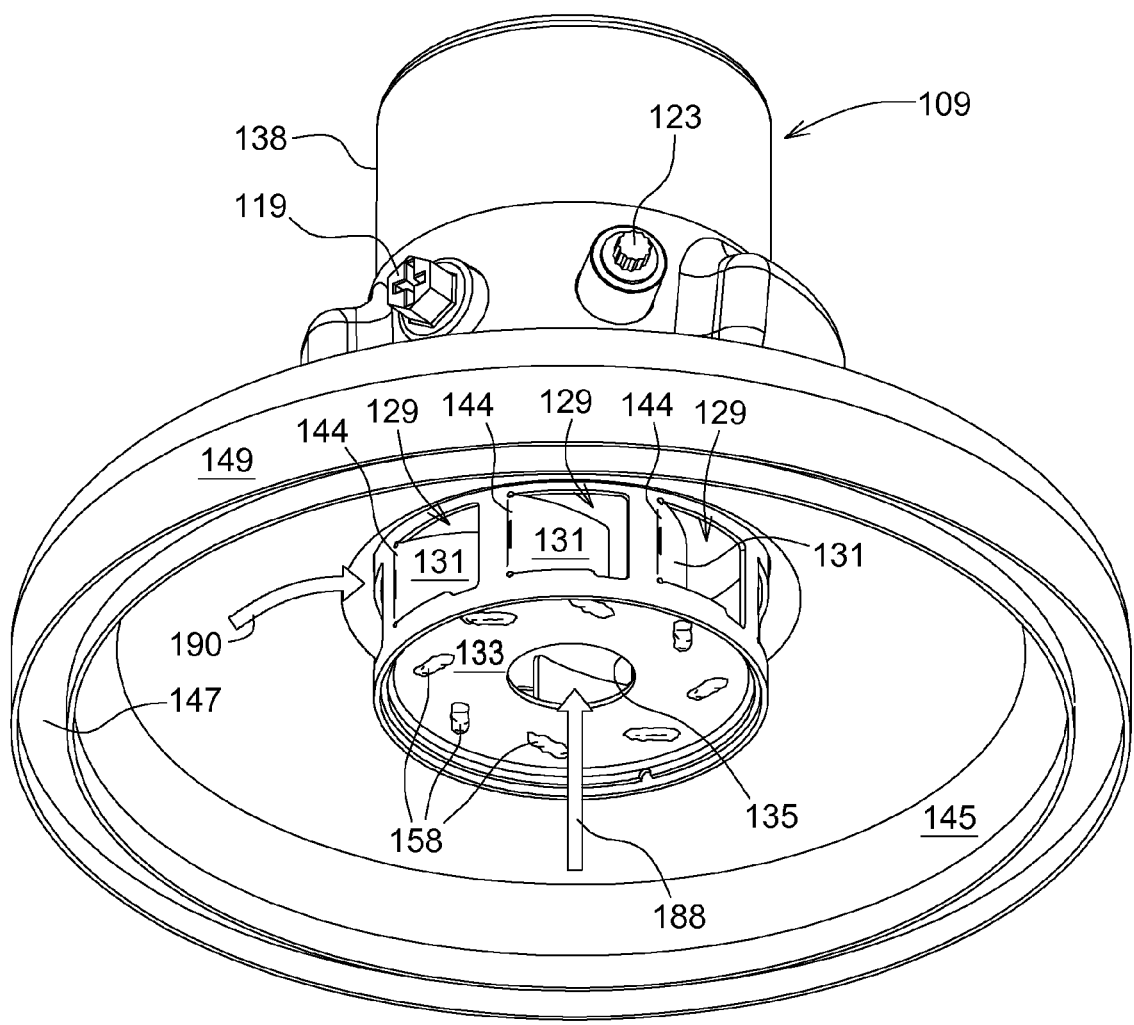
FIG. 3 is a perspective view of an outlet cone and the exhaust gas mixer positioned therein.
Figure 4:
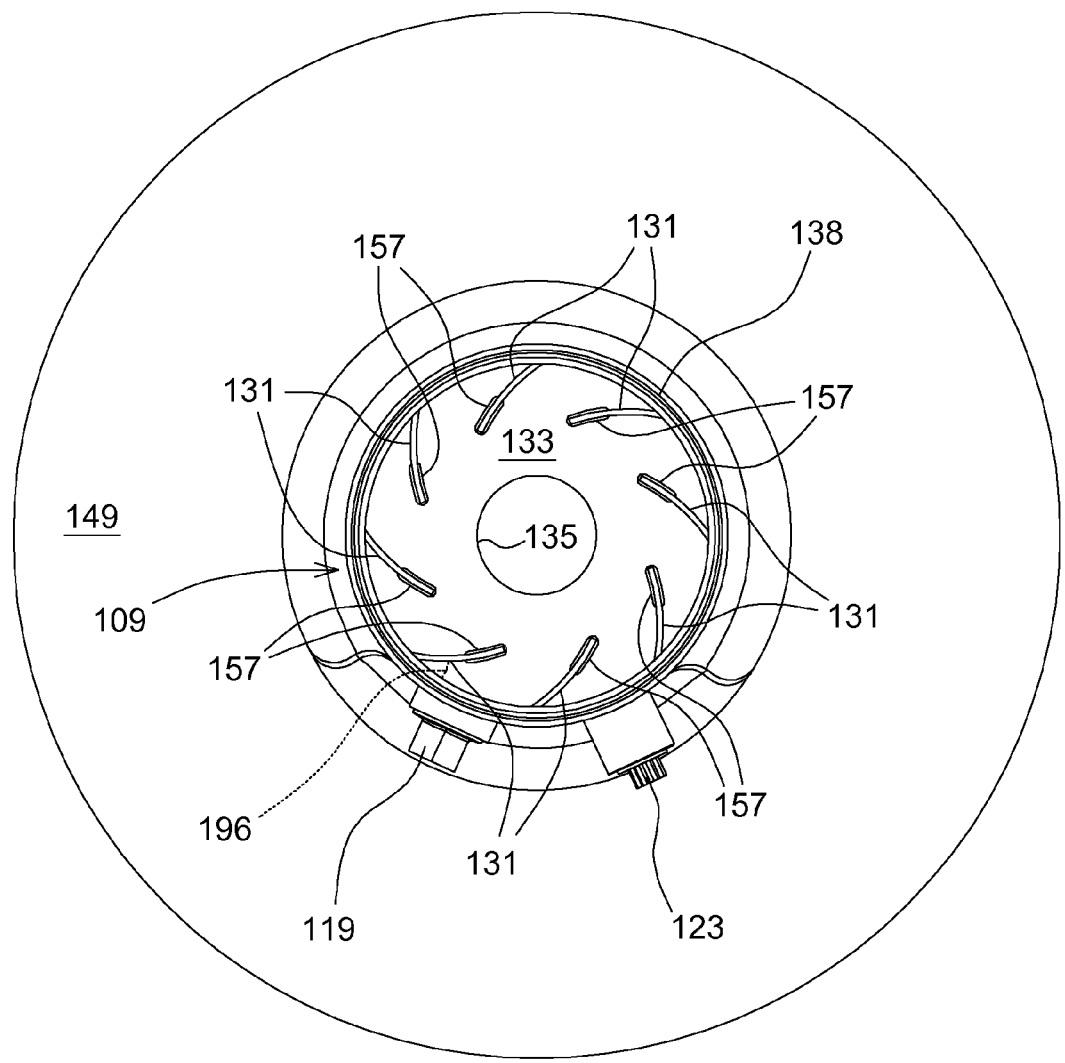
FIG. 4 is an enlarged elevational view of the outlet cone and the exhaust gas mixer as viewed from upstream thereof.
Figure 5:
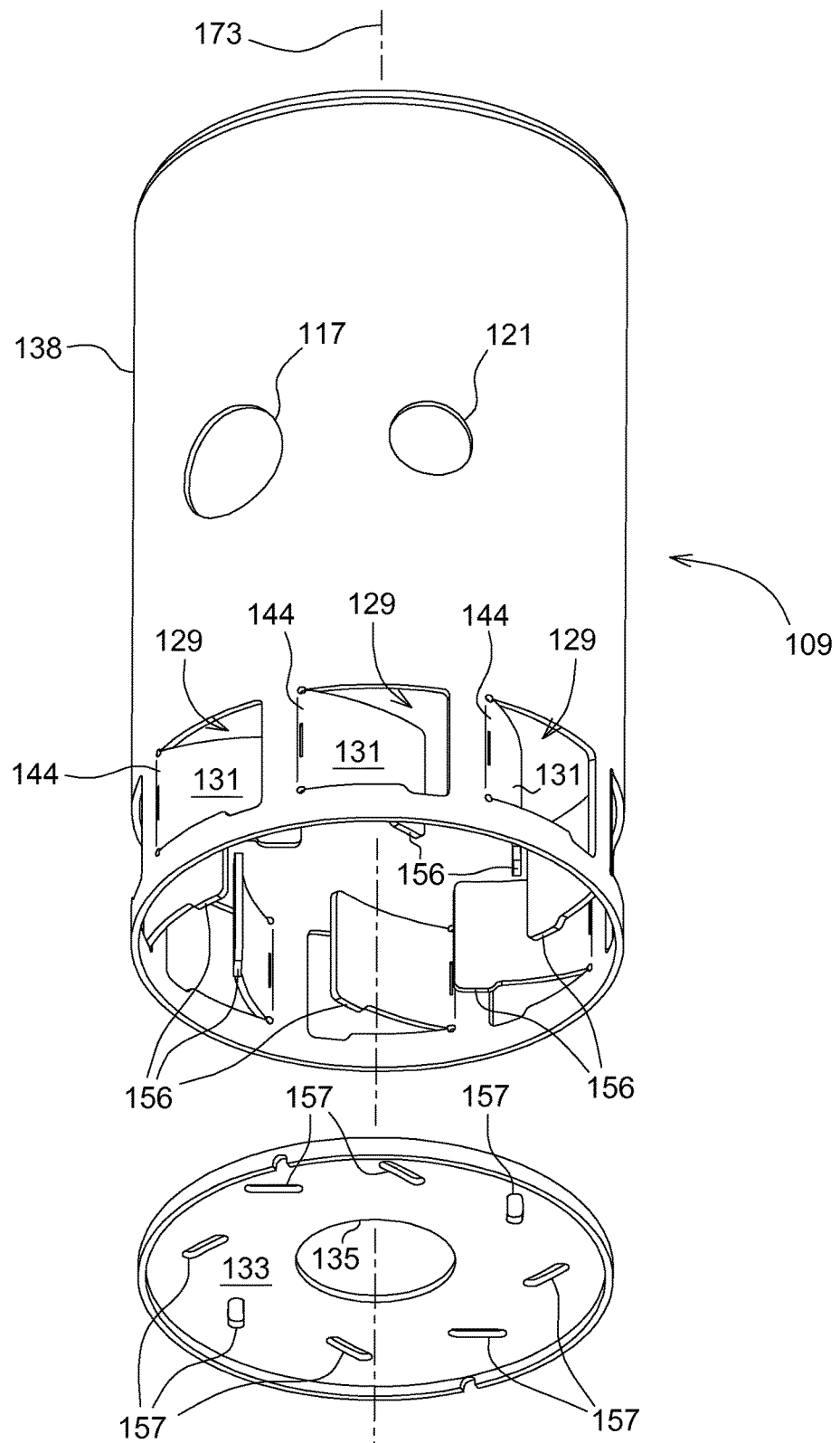
FIG. 5 is a perspective view of the exhaust gas mixer.

Referring to FIGS. 3-5, the exhaust gas mixer 109 includes an inlet plate 133, a tubular surface 138, and a plurality of swirler guides 131. The inlet plate 133 includes an inlet opening 135 for receiving a first portion of exhaust gas 188 that is exiting the SCR catalyst 120 and for reducing the back pressure on the engine 106. The inlet plate 133 may be positioned inside of the tubular surface 138. The inlet plate 133, the tubular surface 138, and the plurality of swirler guides 131 may all be made of stainless steel, a material that is highly resistant to corrosion that might otherwise be caused the aftertreatment process. These components may manufactured by stamping, laser cutting, and bending the stainless steel.

The tubular surface 138 extends downstream from the inlet opening 135 and includes a plurality of peripheral inlet openings 129 positioned so as to receive a second portion of exhaust gas 139. A combined area of the peripheral inlet openings 129 may be greater than an area of the inlet opening 135. The inlet plate 133 tapered radially inward and is coupled to the tubular surface 138 upstream of the peripheral inlet openings 129. The swirler guides 131 may extend radially inwards from a respective peripheral inlet opening 129 and are positioned so as to swirl the second portion of exhaust gas 139 about and into the first portion of exhaust gas 188. In some embodiments of the exhaust gas mixer 109, the flow rate of the first portion of exhaust gas 188 is around 25% of the flow rate of the second portion of exhaust gas 190. This combination may adequately mix the first and second portions of the exhaust gas and the $NO_x$, while simultaneously minimizing the back pressure on the engine 106.

The swirler guides 131 and the tubular surface 138 may be formed by a single piece of material. Each swirler guide 131 may be bent radially inward from the tubular surface 138 at a bend 144, and each swirler guide 131 may extend circumferentially away from each respective bend 144. Each bend 144 is parallel to a longitudinal axis 173 of the tubular surface 138 (see FIG. 5). Each of the swirler guides 131 is positioned completely radially outward from the inlet opening 135 (see FIG. 4). Each swirler guide 131 may form an angle 196 of around 30° relative to the tubular surface 138, as viewed from an elevational view of the exhaust gas mixer 109 (see FIG. 4).

The tubular surface 138 may be positioned in an outlet cone 145 that tapers radially inwards thereto in a downstream direction and may contact a region downstream of the peripheral inlet openings 129. As shown in FIG. 3, the outlet cone 145 may be positioned inside of an insulation layer 147, and the insulation layer 147 may be positioned inside of an outer outlet cone 149 of the SCR canister 154.

A longitudinal axis 173 of the tubular surface 138 may intersect the inlet opening 135. The outlet cone 145 surrounds the peripheral inlet openings 129 and the swirler guides 131. The outlet cone 145 routes the second portion of exhaust gas 190 through the peripheral inlet openings 129 and against the swirler guides 131.

Each swirler guide 131 includes a tab 156 extending upstream therefrom, while the inlet plate 133 may include a plurality of tab receiving apertures 157 positioned radially outward from the inlet opening 135 (see FIG. 4). Each tab 156 is positioned in a tab receiving aperture 157 for positioning and mounting the inlet plate 133 relative to the tubular surface 138. Each tab 156 is coupled to each respective tab receiving aperture 157 with a weld 158 positioned upstream of the inlet plate 133. Upstream of the inlet plate 133 is an easily accessible location for welding the inlet plate 133 to the tubular surface 138.

The exhaust gas mixer 109 may include a sensor opening 117 for receiving a $NO_x$ sensor 119 and a sensor opening 121 for receiving a temperature sensor 123. Both of the sensors openings 117, 121 are positioned downstream of the inlet opening 135 and peripheral inlet openings 129. The $NO_x$ sensor 119, the $NO_x$ sensor 119 produces and transmits a $NO_x$ signal to an engine control unit (ECU) 115, which is indicative of a $NO_x$ content of exhaust gas flowing thereby. The ECU 115 may be used for (1) converting analog sensor inputs to digital outputs, (2) performing mathematical computations for all fuel and other systems, (3) performing self diagnostics, and (4) storing information. The ECU 115 may, in response to the $NO_x$ signal, control a combustion temperature of the engine 106 and/or the amount of a reductant injected into the exhaust gas by the reductant injector 116. The $NO_x$ sensor 119 may rely upon an electrochemical or catalytic reaction that generates a current, the magnitude of which is indicative of the $NO_x$ concentration of the exhaust gas.

Mixing the exhaust gas with the exhaust gas mixer 109, upstream of the $NO_x$ sensor 119, ensures that the signal produced is an accurate representation of the small amount of $NO_x$ that should be exiting the tailpipe 125 and entering the atmosphere. Without such a mixer, the $NO_x$ sensor 119 may send a signal to the ECU 115 that indicates a $NO_x$ concentration that misrepresents the $NO_x$ concentration in the exhaust gas. If a misrepresentative $NO_x$ is transmitted to the ECU 115, the ECU 115 could erroneously derate the engine 106 or shut down the engine 106 entirely.

The power system 100 does not include an SCR catalyst 120 or an AOC 122 downstream of the swirler guides 131. Not including an SCR catalyst 120 and/or an AOC 122 downstream of the swirler guides 131 ensures that the exhaust gas that is mixed, by the exhaust gas mixer 109, is an accurate representation of the $NO_x$ level of the exhaust gas exiting the tailpipe 125 and entering the atmosphere.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An exhaust gas mixer, comprising:
an inlet plate comprising a plate inlet opening, the inlet plate comprising a plurality of tab receiving apertures positioned radially outward from the plate inlet opening, the plate inlet opening being positioned to receive a first portion of an exhaust gas exiting a selective catalytic reduction (SCR) catalyst;
a tubular surface extending downstream, relative to a direction of flow of the first portion of the exhaust gas, from the plate inlet opening, the tubular surface comprising a plurality of peripheral inlet openings positioned to receive a second portion of the exhaust gas exiting the SCR catalyst, the inlet plate being coupled to the tubular surface upstream of the peripheral inlet openings, relative to the direction of flow of the first portion of the exhaust gas, the inlet plate being angled relative to the tubular surface; and
a plurality of swirler guides, each of the swirler guides extending radially inwards from a respective peripheral inlet opening, each of the swirler guides comprising a tab extending upstream, each of the tabs being positioned in a respective one of the tab receiving apertures for positioning the inlet plate relative to the tubular surface, the swirler guides configured to swirl the second portion of the exhaust gas about and into the first portion of the exhaust gas.

2. The exhaust gas mixer of claim 1, wherein each swirler guide is bent radially inward from the tubular surface at a bend, each swirler guide extends circumferentially away from each respective bend, and each bend is parallel to a longitudinal axis of the tubular surface.

3. The exhaust gas mixer of claim 2, wherein the inlet plate is positioned inside of the tubular surface.

4. The exhaust gas mixer of claim 2, wherein each of the swirler guides is positioned completely radially outward from the plate inlet opening.

5. The exhaust gas mixer of claim 2, wherein there is not SCR catalyst downstream of the tubular surface, and there is not an ammonia oxidation catalyst downstream of the tubular surface.

6. The exhaust gas mixer of claim 1, wherein the tubular surface is positioned in an outlet cone that tapers radially inwards thereto in a downstream direction and contacts a region downstream of the peripheral inlet openings, and a longitudinal axis of the tubular surface intersects the plate inlet opening.

7. The exhaust gas mixer of claim 6, wherein the outlet cone surrounds the peripheral inlet openings and swirler guides, and the outlet cone is configured to route the second portion of the exhaust gas through the peripheral inlet openings and against the swirler guides.

8. The exhaust gas mixer of claim 1, wherein each tab is coupled to each respective receiving aperture with a weld positioned upstream of the inlet plate.

9. A power system, comprising:
a selective catalytic reduction (SCR) catalyst;
an exhaust gas mixer positioned downstream, relative to a direction of flow of a first portion of an exhaust gas, of the SCR catalyst, the exhaust gas mixer comprising:
an inlet plate comprising a plate inlet opening positioned to receive the first portion of the exhaust gas exiting the SCR catalyst, the inlet plate comprising a plurality of tab receiving apertures positioned radially outward from the plate inlet opening;
an outer surface comprising a plurality of peripheral inlet openings positioned to receive a second portion of the exhaust gas exiting the SCR catalyst, the inlet plate being coupled to the outer surface upstream of the peripheral inlet openings, relative to the direction of flow of the first portion of the exhaust gas, the inlet plate being angled relative to the outer surface, the outer surface being a tubular surface, the inlet plate being positioned inside of the tubular surface; and
a plurality of swirler guides, each of the swirler guides extending radially inwards from a respective peripheral inlet opening and extending radially inwards from the tubular surface, each of the swirler guides comprising a tab extending upstream, each of the tabs being positioned in a respective one of the tab receiving apertures for positioning the inlet plate relative to the tubular surface, the swirler guides configured to swirl the second portion of the exhaust gas about and into the first portion of the exhaust gas.

10. The power system of claim 9, wherein there is not an SCR catalyst downstream of the swirler guides, and there is not an ammonia oxidation catalyst downstream of the swirler guides.

11. The power system of claim 9, further comprising an ammonia oxidation catalyst (AOC) positioned downstream of the SCR catalyst and positioned upstream of the exhaust gas mixer.

12. The power system of claim 9, wherein each of the swirler guides is positioned completely radially outward from the plate inlet opening.

13. The power system of claim 1, wherein each swirler guide is bent radially inward from the tubular surface at a bend, and each swirler guide extends circumferentially away from each respective bend, and each bend is parallel to a longitudinal axis of the tubular surface.

14. The power system of claim 1, wherein the tubular surface is positioned in an outlet cone that tapers radially inwards thereto in a downstream direction and contacts a region downstream of the peripheral inlet openings, and a longitudinal axis of the tubular surface intersects the plate inlet opening.

15. The power system of claim 14, wherein the outlet cone surrounds the peripheral inlet openings and swirler guides, and the outlet cone is configured to route the second portion of the exhaust gas through the peripheral inlet openings and against the swirler guides.

\* \* \* \* \*